3,494,792
STARCH PRODUCT AND PROCESS
Ernest A. Sowell, St. Louis, and Barrett L. Scallet, Clayton, Mo., assignors to Anheuser-Busch, Incorporated, St. Louis, Mo., a corporation of Missouri
No Drawing. Continuation of application Ser. No. 487,622, Sept. 15, 1965. This application Sept. 6, 1968, Ser. No. 758,155
Int. Cl. C13l 1/00
U.S. Cl. 127—71
2 Claims

ABSTRACT OF THE DISCLOSURE

A starch product comprising 1% to 10% boric acid or borax, 2% to 10% protein which is gelatinized and can be added to an alkaline salt water drilling fluid to reduce the water loss of a filter cake formed on the bore hole walls to less than about 8 ml. by the A.P.I. test.

---

The present application is a continuation of U.S. patent application Ser. No. 487,622, Sept. 15, 1965, now abandoned.

This invention relates to the production of a starch product for use in aqueous oil well drilling fluids. More specifically, it relates to an improved starch product which effectively minimizes fluid loss from oil drilling operations utilizing alkaline salt water fluids and to a method of making same.

In the rotary drilling of oil wells a fluid, generally referred to as a mud, is continuously circulated from the surface under pressure down through the drill pipe to the bit at the bottom of the hole and thence back to the surface through the annular space between the drill pipe and the formation. As the mud circulates it carries away the cuttings of the drill bit and at the same time acts as a lubricant and a coolant. In addition, as the mud is under pressure, loosely consolidated areas of the formation are given support thus retarding the tendency to caving. At the same time the flow of water, oil, or gas that may be encountered from strata being penetrated is hold back by the action of the mud. For the most part, the foregoing mentioned mud functions are dependent upon the deposition of a difficultly permeable filter cake on the walls of the bore hole. This filter cake primarily prevents the loss of the aqueous phase of the mud to the strata which if not prevented would result in failure of mud function with its consequent effect on the entire drilling operation.

Drilling muds are essentially aqueous systems of dissolved or dispersed solids or combinations of both. The disperse phase, consisting primarily of finely divided clays, contributes the general colloidal properties that a mud usually must have for satisfactory performance. Insoluble weighting agents such as barite may also be present. Oil may be present as an emulsified phase. The soluble phase, consisting for the most part of salts, affects the properties of the mud by modification of the colloidal characteristics. Thus, it can be understood that as the art and technology of rotary drilling have advanced the problems of mud requirements and composition have become diverse and complex.

A principal object of the present invention is to provide an improved starch that can be used as an effective filtration control agent in salt water types of drilling muds. In the usual type of drilling mud, having relatively large quantities of dispersed clay solids, the addition of starch, usually in a pregelatinized or cold water soluble form, affects the permeability of the filter cake deposited on the walls of the bore hole in such a way that the loss of water from the mud by filtration is controlled to a minimum. Furthermore, any soluble salts, such as sodium chloride, that may be encountered will tend to disrupt disperse clay systems. This may be circumvented by the addition of a starch which will interact with the clay colloidally and prevent flocculation.

However, in some specialized drilling fluids, to which this invention is directed, clay solids are absent or at a minimum and generally the only solids are those of dissolved salts and alkalis. Such fluids obviously have no wall building capabilities and are lost into any porous formations. In drilling operations where such fluids are used, it is sometimes desirable to have these losses reduced or at least controlled to some extent. As hereinbefore described, filtration control is dependent upon the formation of an impermeable filter cake composed primarily of clay and starch. Since there is essentially no dispersed clay in these salt water muds, ordinary well drilling starches have little effect on fluid losses.

It is, therefore, an important object of this invention to provide a modified starch which will effectively reduce the filtration losses of alkaline salt water drilling fluids. It is a further object of this invention to provide a process by which such a starch can be manufactured. Another object of this invention is to provide an alkaline salt water drilling fluid incorporating the modified starch additive of this invention, said fluid having substantially reduced water losses.

These and other objects and advantages of the present invention will become apparent hereinafter.

Briefly, the present invention comprises the treatment of starch with borax or boric acid, preferably in the presence of high protein levels, pregelatinizing the starch, and mixing the modified starch with an alkaline salt water drilling mud to reduce the water loss of the mud. The present invention further comprises the starch product and the drilling mud hereinafter described and claimed.

Generally stated, and in accordance with the illustrated embodiments of this invention, a pregelatinized starch can be modified, so that it will be suitable as a filtration control agent in fluids of the type hereinbefore described, by treatment of the pregelatinized starch with borax. The amount of borax necessary to be used depends to some extent on the amount of filtration control desired, but generally under most conditions ranges from about 1–10% based on the dry weight of the starch. It is preferable, however, to have the borax incorporated intimately with the pregelatinized starch and this is best done by treating the starch with the borax before it is pregelatinized. For ease of manufacture it is preferable to use boric acid, as boric acid is converted to borax when incorporated in the highly alkaline salt water fluids in which such a starch is to be used. The use of borax in the drying process is frequently accompanied by excessive foaming, thickening and sticking during the well-known drum drying operations which are used for its manufacture.

Any commercially available starch may be used for the present process, although if the protein content is below 2%, it is preferable to add additional protein to bring the protein content to between 2–10%, as this synergistically enhances the borax/boric acid effect already described.

Although borax alone can be used to lower the water loss of the alkaline drilling mud to acceptable levels, it is preferable to use a combination of boric acid or borax and high protein level for the best results.

For evaluation of the effectiveness of this type of drilling fluid starch the following procedure is used:

DRILLING FLUID TEST 10 gm. of the starch to be evaluated are added to 350 ml. of a salt solution containing 30 gm. of NaCl. After mixing 2 minutes on the Multimixer, 1 gm. of NaOH is added to the solution. The mixture is then agitated by the Multimixer for an additional 18 minutes. The fluid is then aged 8–16 hours. At the end of the aging period, the fluid is mixed for 5 minutes and then transferred to the cell for determination of the filtration loss by the A.P.I. procedure using 100 p.s.i. for 30 minutes. The filtration loss should be less than 8 ml. in 30 minutes for a starch to be suitable.

The manufacturer of the Multimixer is Sterling Multi Products, Incorporated, Sterling, Illinois.

The American Petroleum Institute (A.P.I.) test is API Recommended Practice Standard Procedure for Testing Drilling Fluids, American Petroleum Institute, Division of Production, Dallas, Tex., and is reported in Bulletin API RP 13-B, 1st Edition, November 1962.

The following example, Example No. 1, shows the effectiveness of incorporating borax in a salt water drilling fluid containing ordinary pregelatinized corn starch.

EXAMPLE NO. 1

Using the foregoing described evaluation procedure, a typical pregelatinized well drilling starch derived from corn is used. After the 24 hour aging time, the filtration loss of the untreated starch is 44.0 ml. Such a high value of filtration loss is unsuitable. However, by using the same starch with the addition of 5% borax, the filtration loss is reduced to approximately 6.0 ml. Further addition of borax up to 20% does not reduce the filtration loss below that obtained with 5% borax.

As stated previously, it is an advantage to have the desired quantity of borax thoroughly and intimately incorporated with the pregelatinized starch. This facilitates the use of the starch under field conditions and results in economies of operation, etc.

The incorporation of borax in a pregelatinized starch can be done by a dry blending procedure in which the finished dried pregelatinized starch is mixed in a blender with the desired quantity of borax. However, such blending operations are cumbersome, costly and may result in inefficient blending. A more desirable process is to add the borax to the starch slurry prior to the cooking and drying procedures of the well-known starch pregelatinization process. This, of course, may be done. However, since the starch is to be used in highly alkaline salt waters it is preferable to add boric acid to the slurry, as this substance will be converted to borax when the finished starch is added to the highly alkaline salt water. The use of boric acid prior to the pregelatinization process eliminates the thickening, sticking and foaming which a borax treated starch exhibits during the usual procedures of drum drying used in the manufacture of pregelatinized well drilling starches. Generally the quantity of boric acid to be incorporated with the starch is within the same range as that used for borax, i.e. 1-10% based on the weight of the starch. However, as stated before, the amount to be used depends upon the degree of filtration control desired. In most cases the use of about 5% boric acid based on the starch weight is suitable.

EXAMPLE NO. 2

To a water slurry of corn starch having a solids of approximately 40-45% an amount of boric acid equivalent to 5% of the dry weight of the starch is added and mixed. The slurry is then gelatinized, dried to a moisture content of approximately 10% and ground to a particle size of at least 30 mesh. The use of a product such as this in the alkaline salt water test previously described results in a 30 minute filtration loss after aging for 16 hours of 5.0 ml. The addition of 10% boric acid, again as was found with borax, did not change the filtration loss appreciably.

The protein fraction that is associated with most native starches and is usually removed in milling operations can be used to some extent as an adjuvant to the borax/boric acid treatment of well drilling starch. Generally for best effect, the protein content should range within 3-10% of the dry weight of the starch.

EXAMPLE NO. 3

A corn starch containing approximately 1% protein based on the weight of the starch gives a filtration loss of about 31.5 ml. after 24 hours of aging. Increasing the protein content of 3.0% reduces the filtration loss to 11.0 ml. In the latter case the addition of 2.5% boric acid lowers the filtration loss further to 3.8 ml. Under the usual conditions 2.5% boric acid without the corn protein lowers the filtration loss to about 7.8 ml. Thus, the combination of high protein level and boric acid synergistically reduced the water loss level to an extremely low figure.

This invention is intended to cover all changes and modifications of the examples of the invention herein chosen for purposes of disclosure, which do not constitute departures from the spirit and scope of the invention.

What is claimed is:

1. A method of making a starch product comprising adding protein to a starch including less than 2% protein by weight to raise the level of the protein within a range of about 2% to about 10% by weight, adding boric acid to the starch within a range of about 1% to about 10% by weight, and then gelatinizing the starch.

2. A method of making a starch product comprising adding protein to a starch including less than 2% protein by weight to raise the level of the protein within a range of about 2% to about 10% by weight, then gelatinizing the starch, and then adding to the starch from about 1% to about 10% by weight of an ingredient selected from the group consisting of borax and boric acid.

References Cited

UNITED STATES PATENTS

| | | | |
|---|---|---|---|
| 1,677,348 | 7/1928 | Kantorowicz | 127—33 |
| 1,939,973 | 12/1933 | Giesecke | 127—71 X |
| 2,417,307 | 3/1947 | Larsen | 252—8.5 |
| 2,452,021 | 10/1948 | Wayne | 252—8.5 |
| 2,525,783 | 10/1950 | Farrow | 252—8.5 |
| 2,908,597 | 10/1959 | Owen | 127—71 |
| 2,935,377 | 5/1960 | Jones | 127—33 X |
| 3,294,681 | 12/1966 | Stearns et al. | 252—8.5 |

HERBERT B. GUYNN, Primary Examiner

U.S. Cl. X.R.

127—33; 252—8.5